(12) United States Patent
Blum et al.

(10) Patent No.: US 6,632,481 B1
(45) Date of Patent: Oct. 14, 2003

(54) BINDERS CURABLE THERMALLY AND/OR BY HIGH-ENERGY RADIATION

(75) Inventors: Rainer Blum, Ludwigshafen (DE); Rodriguez Jorge Prieto, Senden (DE); Wolfgang Reich, Maxdorf (DE)

(73) Assignee: BASF Coatings AG, Muenster (DE)

( * ) Notice: Subject to any disclaimer, the term of this patent is extended or adjusted under 35 U.S.C. 154(b) by 0 days.

(21) Appl. No.: 09/762,486

(22) PCT Filed: Aug. 6, 1999

(86) PCT No.: PCT/EP99/05700

§ 371 (c)(1),
(2), (4) Date: Feb. 7, 2001

(87) PCT Pub. No.: WO00/08108

PCT Pub. Date: Feb. 17, 2000

(30) Foreign Application Priority Data

Aug. 7, 1998 (DE) .......................................... 198 35 917

(51) Int. Cl.⁷ ..................... C08L 75/14; C09D 175/14
(52) U.S. Cl. ................. 427/496; 427/508; 427/385.5; 525/44; 525/445; 525/454; 525/455; 525/530; 525/531; 522/90; 522/100; 522/101; 522/102; 522/103; 522/104; 522/106; 522/107
(58) Field of Search ..................... 525/44, 445, 454, 525/455, 530, 531; 522/90, 100, 101, 102, 103, 104, 106, 107; 427/496, 508, 385.5

(56) References Cited

U.S. PATENT DOCUMENTS

| | | | | |
|---|---|---|---|---|
| 4,064,161 A | * | 12/1977 | Lewis | 526/320 |
| 4,163,810 A | | 8/1979 | McGinniss | |
| 4,389,512 A | * | 6/1983 | Friedli | 525/112 |
| 4,546,129 A | * | 10/1985 | Hefner | 523/456 |
| 4,753,982 A | * | 6/1988 | Hefner | 525/31 |
| 5,068,305 A | | 11/1991 | Meixner et al. | |
| 5,360,863 A | | 11/1994 | Meixner et al. | |
| 5,484,850 A | | 1/1996 | Kempter et al. | |
| 6,106,905 A | | 8/2000 | Blum et al. | |
| 6,162,840 A | | 12/2000 | Blum et al. | |
| 6,313,250 B1 | * | 11/2001 | Blum | 526/284 |

FOREIGN PATENT DOCUMENTS

| | | | |
|---|---|---|---|
| DE | 42 26 520 | | 2/1994 |
| DE | 19600150 | * | 7/1997 |
| EP | 410 242 | | 1/1991 |
| EP | 636 669 | | 2/1995 |
| EP | 650 978 | | 5/1995 |
| EP | 650 979 | | 5/1995 |
| WO | 97/25157 | | 7/1997 |
| WO | 97/25362 | | 7/1997 |
| WO | 97/25365 | * | 7/1997 |
| WO | 97/25387 | | 7/1997 |

OTHER PUBLICATIONS

Derwent–DE19600152, Jul. 1997.
Derwent —DE 1960015, Jul. 1997.
OZ 0062/02146–BASF = WO 97/25724, Jul. 1997.

* cited by examiner

Primary Examiner—Patricia A. Short
(74) Attorney, Agent, or Firm—Keil & Weinkauf

(57) ABSTRACT

The invention relates to a binder, preferably for coating materials, which is curable thermally and/or by high-energy radiation and comprises a mixture of substances comprising (a) as one component, monomers or polymers which have a least one vinyl ether, vinyl ester, (meth)acrylic and/or allyl group and (b) as a further component, saturated polymers and/or unsaturated polymers different from component (a), with the proviso that at least one of components (a) and (b) has structural units of the formulae (I) and/or (II)

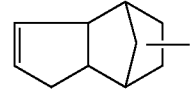

(I)

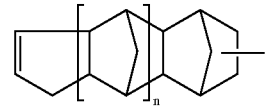

(II)

n = 1–10 the other component (b) has structural units of the formulae (I) and/or (II) at least when it contains saturated polymers.

The invention also relates to a process for preparing the binder and to a formulation which comprises the binder of the invention. This formulation is in the form of a pigmented or unpigmented coating material or powder coating material.

In addition, the invention relates to a procedure for preparing coatings, which following application are cured thermally and/or by irradiation with UV light or electron beams.

45 Claims, No Drawings

BINDERS CURABLE THERMALLY AND/OR BY HIGH-ENERGY RADIATION

The invention relates to a binder, preferably for coating materials, which is curable thermally and/or by high-energy radiation, to a process for preparing it, to a formulation comprising the binder, and to a procedure relating to the formulation.

UV-curable coating materials for use in liquid form, and powder coating materials, are continually acquiring more fields of use on the grounds of reduced solvent consumption. A major problem with known UV coating materials, however, is the inhibiting effect of atmospheric oxygen on curing at the film surface. To overcome this inhibition, lamps with very high energy density, and accelerated curing by means of amine coinitiators, are required. These amines are frequently the cause of odor nuisance.

In the case of UV powder coating materials, in addition, further problems arise from the contradictory requirements for good blocking resistance of the powders on storage and good levelling of the melted coating film. For good blocking resistance, the glass transition temperature and melting point should be as high as possible, whereas for good levelling, and to permit use on heat-sensitive substrates, they should be as low as possible, in order to prevent a curing reaction before optimum surface smoothness has developed and in order to prevent substrate damage. Likewise for the purpose of improving the surface smoothness, the melt should also have a low viscosity and the reaction should set in only after a delay period. These concepts are difficult to realize with powder coating materials whose curing is based on one of the known, thermally activated reactions between resin and hardener, e.g., polyepoxy resin and dicarboxylic acid hardener, since a viscosity-increasing reaction sets in simultaneously with the melting process. In the case of radiation-curable powder coating materials, on the other hand, it should be possible to separate the melting process from crosslinking. In order to meet this requirement, various attempts have been disclosed in the prior art.

U.S. Pat. No. 4,129,488 and U.S. Pat. No. 4,163,810 disclose UV-curable powder coating materials having specific spatial arrangements of ethylenically unsaturated polymers. Here, the binder consists of an epoxy-polyester polymer in which the epoxy adduct is arranged spatially such that by means of a linear polymer chain it is arranged at a distance from the polyester adduct. In addition, the polymer comprises a chemically bonded photoinitiator.

EP-A 0 650 978, EP-A 0 650 979 and EP-A 0 650 985 disclose copolymers whose essential constituent is a relatively high fraction of monomers having the structural unit of methacrylic acid. These copolymers can be used as binders for UV-curable powder coating materials, and feature a relatively narrow molecular weight distribution.

EP-A 0 410 242 discloses binders for UV-curable powder coating materials, consisting of polyurethanes which have specific (meth)acryloyl groups, can be crosslinked without a crosslinker component or peroxides, and are therefore stable on storage. Crosslinking by UV irradiation requires the addition of photoinitiators.

EP-A 0 636 669, furthermore, discloses a UV-curable binder for powder coating materials which consists of unsaturated polymers, which can include dicyclopentadiene, and a crosslinking agent which has vinyl ether groups, vinyl ester groups or (meth)acrylic groups.

DE-A 42 26 520 discloses liquid compositions comprising unsaturated polymers, in the form of unsaturated polyesters, and compounds containing (meth)acryloyl groups and/or vinyl ether groups. These compositions can be crosslinked both by means of free-radical initiators and by means of radiation curing, and are used as binders for coating materials. In the case of crosslinking by UV radiation, it is necessary to add photoinitiators.

With the UV coating materials of the cited prior art, problems arise as a result of the monomeric photoinitiators added and as a result of the need to employ coinitiators, generally amines, in order to provide high photosensitivity and to overcome the known oxygen inhibition of the surface. The elimination products of these photoinitiators remain in the cured coatings and are the cause of odor nuisance.

WO 97/25724 discloses a process for coating wound and profiled wires with solvent-free polyester resins, polyester-imide resins or polyurethane resins which comprise monomeric or polymeric dicyclopentadiene structural units.

A process for coating articles with UV-curable powder coating materials is disclosed by WO 97/25157. There, the binder of the powder coating materials used comprises copolymers formed from a monomer which has at least one (meth)acrylic group, and special dicyclopentadiene derivatives.

WO 97/25387 discloses, as low-emission binders for coatings, the use of monomer-free saturated and unsaturated polyester resins or mixtures of saturated and unsaturated polyester resins which contain monomeric or polymeric dicyclopentadiene structural units. Also, WO 97/25362 discloses the use of the same compounds as impregnating, casting and coating compositions for components in electrical engineering and electronics and for support materials for sheetlike insulating substances.

Against the background of this prior art, it is an object of the present invention to provide a binder which is curable with high reactivity thermally and/or by high-energy radiation and can be employed preferably, but not exclusively, for coating materials, especially powder coating materials, without oxygen inhibition of the surface, so that it is possible to forego the use of malodorous amines and other coinitiators.

We have found that this object is achieved by a binder which comprises a mixture of substances comprising (a), as one component, monomers or polymers which have at least one vinyl ether, vinyl ester, (meth)acrylic and/or allyl group and (b), as a further component, saturated polymers and/or unsaturated polymers different from component (a), with the proviso that at least one of components (a) and (b) has structural units of the formulae (I) and/or (II)

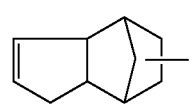

(I)

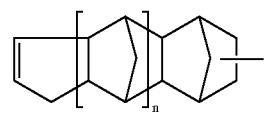

(II)

n = 1–10 and the further component (b) has structural units of the formulae (I) and/or (II) at least when it contains saturated polymers.

These binders of the invention are surprisingly crosslinkable with high reactivity under high-energy radiation, preferably under UV light, and show no oxygen inhibition of the surface even without the use of coinitiators.

In one preferred embodiment component (a) is formed from starting compounds which are selected from the group consisting of vinyl ethers of mono- and polyfunctional (poly)hydroxy compounds, (poly)urethane vinyl ethers and vinyl ether-terminated polyesters and also mixtures of two or more of these compounds.

Alternatively, component (a) can also be formed from starting compounds which are selected from the group consisting of (meth)acrylates of mono- and polyfunctional (poly)hydroxy compounds and (poly)urethane (meth) acrylates, (meth)acrylate-terminated polyesters, (meth) acrylate-fuctionalized epoxy compounds, and also mixtures of two or more of these compounds.

In a further preferred embodiment, components (a) and/or (b) can possess copolymerically bonded groups which in the triplet-excited state are capable of abstracting hydrogen. Groups of this kind are known as Norrish II-type photoinitiators. A particular advantage with the binders of the invention is that it is possible completely to forego the addition of monomeric photoinitiators if these copolymeric photoinitiators are present.

The binder can contain components (a) and (b) in a ratio of from 99.5:0.5 to 0.5:99.5. In this context, preference is given to mixing ratios of from 90:10 to 10:90 and particular preference to those from 70:30 to 30:70.

The invention additionally provides a process for preparing the binder of the invention, in which, in components (a) and, if desired, (b), the structural units of the formulae (I) and (II) are introduced by way of esters of dihydrodicyclopentadienol, of the formula (III)

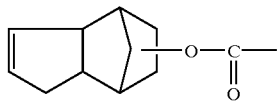
(III)

with monomeric or polymeric carboxylic acids and/or by way of esters of oligodihydrodicyclopentadienol, of the formula (IV)

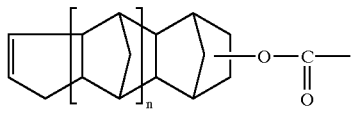
(IV)

n = 1–10 with mono- or polyfunctional carboxylic acids.

In one preferred embodiment, in components (a) and, if desired, (b), the structural units of the formulae (I) and (II) are introduced with the use of compounds of the formulae (V) and/or (VI)

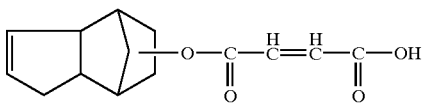
(V)

(VI)

n = 1–10

Compounds of the formulae (V) and (VI) are obtained by the known addition reaction of dicyclopentadiene (DCPD) and water with anhydrides of dicarboxylic or tetracarboxylic acids, preferably with maleic anhydride. Here, the acidity of the carboxyl groups, which following the addition of one mole of DCPD per anhydride of the ester groups are adjacent, is so weakened that fractions with oligo structures as per formula (II) are formed when it is attempted to add on further DCPD. Oligo-DCPD mixtures are also obtained by polycycloaddition of cyclopentadiene under superatmospheric pressure at temperatures of from 170 to 300° C. These mixtures can be worked up by distillation. Preferably, however, they are reacted directly with, for example, maleic anhydride and water to form mixtures of compounds of the formulae (V) and (VI). The esterification of this carboxylic acid with, for example, polyfunctional hydroxy compounds leads to a component (a) of the invention which comprises residues of the maleic or fumaric esters.

The invention additionally provides formulations which comprise a binder of the invention. Here, the binder present in the formulation may have been obtained in accordance with the process of the invention. The formulation preferably consists of a pigmented or unpigmented coating material.

The formulation can comprise the binder in liquid or solvent-free form or else in the form of solutions or dispersions with appropriate solvents. Furthermore, the formulation may comprise at least one customary coatings auxiliary or additive as further constituents.

Formulation as a powder coating material is particularly preferred.

The invention additionally provides a process for producing coatings in which a formulation of the invention is applied to the surface to be coated and is cured thermally and/or by irradiation with UV light or electron beams.

If coating is carried out with a formulation in the form of a powder coating material, the components (a) and (b) can be solid substances which are cured thermally and/or by irradiation with UV light or electron beams. The binders are also curable by stoving, in which case curing catalysts and/or curing initiators can be used. Known initiators for thermal curing are peroxides, azo compounds and C—C-labile substances of the type, for example, of the pinacols.

A considerable acceleration of UV curing or reduction in curing temperature is possible with the combined use of heat and UV light. This enables UV-curable powder coating materials to be used on heat-sensitive substrates such as plastic and wood. In that case, only the surface is heated, preferably by means of IR radiation, to the extent required for melting of the powder. Then UV light is irradiated. Owing to the combination of heat and UV radiation, curing takes place so rapidly that damage to the substrate can be ruled out.

In the case of curing, it is also possible to use one or more conventional curing mechanisms: for example, cocrosslinking with polyfunctional isocyanates, amino resins such as maleic-urea resins or benzoguanamine-formaldehyde resins, polyfunctional epoxies or the like. The crosslinking mechanisms that can be used in addition may also lead to the development of interpenetrating networks in the coatings, by means of which special and desirable properties are often achieved—particularly high chemical resistance being one example.

Examples of compounds for component (a) of the binder of the invention are:

(poly)urethanes, which are obtainable in a manner known per se from polyfunctional isocyanates and isocyanate-reactive substances. The unsaturated groups in this case are incorporated by the use of unsaturated compounds, preferably unsaturated hydroxy compounds, such as hydroxy-functional (meth)acrylates, e.g. hydroxyalkyl (meth)acrylates, hydroxycycloalkyl (meth)acrylates, hydroxy-functional vinyl esters or vinyl ethers and hydroxy-functional allyl compounds, such as allyl alcohol. The term polyurethanes is intended to embrace not only compounds whose main chain is linked by way of urethane linkages but also those compounds which have ester-chain or ether-chain members, i.e., the polyester urethanes and polyether urethanes. In this case the structural units of the formulae (I) and/or (II) can be introduced by the use of dihydrodicyclopentadienol, for example.

Favorable compounds for component (a) have proven to be those which in addition to the structural units of the formulae (I) and/or (II) comprise residues of the maleic or fumaric esters. It is advantageous to introduce such residues by using of compounds of the formulae (V) and/or (VI). If component (a), in accordance with one embodiment of the invention, also has active structural residues of a photoinitiator of the Norrish II type, this can be introduced by using, for example, 4-hydroxybenzophenone and/or benzophenonetetracarboxylic acid compounds. If polyfunctionally isocyanate-reactive compounds are used in this case, then polymers or oligomers are formed.

Preferred compounds for component (a) are those which in addition to the structural units of the formulae (I) and/or (II) include residues of the maleic/fumaric esters and active structural radicals of a photoinitiator of the Norrish II type.

Further highly suitable compounds for component (a) are vinyl ether resins, for example, vinyl ether urethanes, as specified for example in EP-A 0 505 803 and EP-A 0 636 669. Also highly suitable are vinyl ether-terminated polyesters as specified in WO 89/10346. Compounds which prove to be particularly suitable are those prepared using hydroxyl- and/or isocyanate-reactive benzophenone compounds, such as benzophenonecarboxylic anhydrides, for example.

Further examples of compounds for component (a) of the binder of the invention are (poly)epoxides, which are obtainable from known, preferably polyfunctional epoxy compounds, of the type of the bisphenol A epoxy compounds or of the type of the bisphenol A epoxy resins (as obtainable for example under the commercial designation Epikote), for example, by reaction with compounds that are reactive with epoxide groups. The introduction of the unsaturated groups in this case is performed by reaction with compounds having unsaturated groups. Of these, preference is given to (meth)acrylic acid. If such compounds for component (a) preferably have residues of maleic or fumaric esters, these residues can be introduced by compounds of the formulae (V) and/or (VI). If the compounds for component (a) likewise include active structural radicals of a photoinitiator of the Norrish II type, these can be introduced by way of 4-hydroxybenzophenone or benzophenonetetracarboxylic acid, benzophenonetetracarboxylic anhydrides, benzo-phenonetetracarboxylic esters and benzophenone-tetracarboxamides. If polyfunctionally epoxy-reactive compounds or polymeric epoxy resins are used in this instance, then polymers or oligomers are formed.

In general, compounds for component (a) can be obtained by reacting compounds containing functional groups with unsaturated compounds that are able to react with the aforementioned compounds. These compounds as well may have been modified with residues of maleic or fumaric esters and may contain active structural radicals of a photoinitiator of the Norrish II type. Examples of compounds of component (a) having such a structure are polyfunctional isocyanate compounds, which are reacted with hydroxy-functional unsaturated compounds, or polyfunctional hydroxy compounds, which are esterified with unsaturated carboxylic acids such as, for example, those of the formulae (V) and (VI).

Polyacrylates as compounds of component (a) are used preferably to prepare UV powder coating materials. They are obtained by copolymerizing acrylic esters alone or together with further compounds copolymerizable with acrylic esters. Structural units of the formulae (I) and/or (II) can be introduced, for example, by way of dihydrodicyclopentadienyl (meth)acrylate, dihydrodi-cyclopentadienyl ethacrylate and dihydrodi-cyclopentadienyl cinnamate. If it is intended that these compounds should at the same time include residues of maleic or fumaric esters, then these residues can be introduced together with structural units of the formulae (I) and/or (II) by way of compounds copolymerizable with acrylic esters, of the formulae (V) and/or (VI). Active structural radicals of a photoinitiator of the Norrish II type can be introduced by way of ethylenically unsaturated, aromatic or partially aromatic compounds which are copolymerizable with acrylates and which, before and/or after the polymerization, are capable in the triplet-excited state of hydrogen abstraction; for example, by way of copolymerizable derivatives of benzophenone and compounds as known through EP-A 0 486 897, DE-A 38 20 463 and DE-A 40 07 318. Such compounds are in particular those derived from aromatic or partially aromatic ketones or those which have thioxanethone structures. The active structural radicals of the photoinitiator of the Norrish II type are present in copolymerized form in component (a) in amounts of 5–80% by weight, preferably 5–30% by weight. For reasons of cost, for example, the proportion of these compounds which, if desired, are to be copolymerized and which are capable of abstracting hydrogen, is kept as low as possible. Since they strongly influence the photosensitivity of the finished binder, it is judicious to determine the modified optimum proportion in each case individually by means of experimentation in accordance with the envisaged application.

In this context, the unsaturated groups are introduced in a manner known per se by polymer-analogous reaction of copolymeric reactive groups with unsaturated compounds that are able to react with them. Examples of these are hydroxyl-functional polyacrylates, which are reacted with unsaturated isocyanates or methacrylic anhydride or are esterified with (meth)acrylic acid; carboxyl-functional polyacrylates, which are reacted with unsaturated epoxy compounds, preferably glycidyl methacrylate, or are esterified with unsaturated hydroxy compounds; and epoxy-functional polyacrylates, which are reacted with unsaturated carboxylic acids, preferably (meth)acrylic acid.

These polyacrylates are preferably prepared by solvent-free bulk free-radical polymerization in a stirred reactor, at atmospheric or superatmospheric pressure, or, with particular preference, in continuous through-flow-type reactors at temperatures above the melting point of the resultant polymer, preferably below 140° C.

This method produces polyacrylates of low molecular weight and narrow molecular weight distribution, which is highly desirable in the case of powder coating materials owing to the resultant narrower melting range and the lower melt viscosity. Furthermore, bulk polymerization does away with the need to remove an auxiliary solvent, and it is possible to incorporate pigments and coatings auxiliaries directly into the melt. Here, the very good heat stability of the resins of the invention is an advantage. However, the binders of the invention also embrace those acrylically unsaturated polyacrylate resins which have been prepared in solvents or in accordance with the abovementioned solvent-free technology: such resins are obtainable, for example, by reacting (meth)acrylic acid with copolymerized glycidyl (meth)acrylate. In this case, however, the greater thermal sensitivity must be borne in mind at the workup stage and when formulating the powders.

The selection of the monomers or polymers to be combined takes place in accordance with the requirements that are made of UV-cured coating materials. In this context, the basic principles governing the selection and the mixing of the corresponding monomers or polymers for establishing the basic properties of the coating materials are known to the polymer chemist and to the skilled worker. These requirements can be very different. For clear topcoats of automotive metallic finishes, for example, the utmost yellowing resistance and weathering stability, scratch resistance and gloss retention are called for along with a high level of hardness.

In the case of a coil coating material, i.e., a coating material with which metal strips are coated, then wound up and processed further later, with deformation, important parameters are very high elasticity and adhesion.

The price of the monomers or polymers may also be a criterion for selection if for certain applications high quality of the coatings is not a particular requirement but a low price is.

In principle, the hardness, glass transition temperature and softening point of the polymers can be increased by using higher proportions of "hard" monomers, such as styrene or the (meth)acrylates of C1 to C3 alcohols, whereas, for example, butyl acrylate, ethylhexyl acrylate or tridecyl acrylate, as "soft" monomers, attenuate these properties but at the same time improve the elasticity. In addition, it is also known that minor proportions of (meth)acrylic acid or (meth)acrylamide improve the adhesion.

The influences of the molecular weight, the molecular weight distribution, the control of the polymerization by means of regulators, temperature regime and catalyst selection, are also known per se to the person skilled in the art.

Examples of components suitable for synthesizing polyacrylate resins are the esters of acrylic acid and methacrylic acid with aliphatic, cycloaliphatic, araliphatic and aromatic alcohols of 1 to 40 carbon atoms, e.g.: methyl (meth) acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth) acrylate, isoamyl (meth)acrylate, hexyl (meth)acrylate, 2-ethylhexyl (meth)acrylate, benzyl (meth)acrylate, tetrahydrofurfuryl (meth)acrylate, furfuryl (meth)acrylate and the esters of 3-phenylacrylic acid and the various isomeric forms thereof, e.g., methyl cinnamate, ethyl cinnamate, butyl cinnamate, benzyl cinnamate, cyclohexyl cinnamate, isoamyl cinnamate, tetrahydrofurfuryl cinnamate, furfuryl cinnamate, and also acrylamide, methacrylamide, methylolacrylamide, methylolmethacryl-amide, acrylic acid, methacrylic acid, 3-phenylacrylic acid, hydroxyalkyl (meth)acrylates, such as ethylglycol mono(meth)acrylate, butylglycol mono(meth)acrylate, hexanediol mono(meth) acrylate, glycol ether (meth)acrylates, such as methoxyethylglycol mono(meth)acrylate, ethyloxyethylglycol mono (meth)-acrylate, glycidyl acrylate, glycidyl methacrylate, and amino (meth)acrylates, such as 2-aminoethyl (meth) acrylate.

Compounds suitable as the further component are free-radically copolymerizable monomers, such as styrene, 1-methylstyrene, 4-tert-butylstyrene, 2-chlorostyrene, vinyl esters of fatty acids having 2 to 20 carbon atoms, vinyl acetate, vinyl propionate, vinyl ethers of alkanols having 2 to 20 carbon atoms, such as vinyl isobutyl ether, and also vinyl chloride, vinylidene chloride, vinyl alkyl ketones, dienes, such as butadiene and isoprene, and esters of maleic and crotonic acid. Further suitable monomers are cyclic vinyl compounds, such as vinylpyridine, 2-methyl-1-vinylimidazole, 1-vinylimidazole, 5-vinylpyrrolidone and N-vinylpyrrolidone. It is also possible to employ monomers having allyl-position unsaturation, such as allyl alcohol, allyl alkyl esters, monoallyl phthalate and allyl phthalate. Also suitable are acrolein, methacrolein, and polymerizable isocyanates.

Particularly important monomers are those which contain readily abstractable hydrogen atoms. These are in particular monomers having the following groups: isoalkyl groups of 3 to 12 carbon atoms, such as isopropyl, isobutyl or ethylhexyl groups, aminoisoalkyl groups of 3 to 12 carbon atoms, such as diisopropylaminoethyl, N-isobutyl-isopropyl-aminoalkyl, cycloisoalkyl groups of 5 to 8 carbon atoms, such as methylcyclohexyl, isopropylcyclohexyl, cycloalkyl, furfuryl and tetrahydrofurfuryl groups, p-menthyl, terpine and thymol groups. Examples of other particularly suitable compounds are isobornyl acrylate, isobornyl methacrylate, isobornyl ethacrylate, isobornyl cinnamate, adamantane acrylate, adamantane methacrylate, adamantane ethylacrylate, and adamantane cinnamate in the various isomeric forms. Proportions of these compounds raise the photosensitivity of the polymers.

Monomers which in addition to the double bond have other functional groups can be used for an additional, heat-activatable crosslinking reaction, and if so are present in proportions of from 1 to 60% of the monomers. In general, however, they are employed in fairly minor amounts in which they improve, for example, the adhesion, the electrostatic chargeability, the rheology of the coating materials and the surface smoothness. Derivatives of 3-phenylacrylic acid, in addition, as incorporated stabilizers, enhance the weathering stability of coatings. Maleic anhydride can be copolymerized in proportions with (meth) acrylates and styrene: such copolymers undergo addition with water and dicyclopentadiene and adducts likewise classified under component (a) according to the invention.

Examples of compounds of component (b) of the binder of the invention:

When the binder of the invention is used for UV powder coating materials, preference is given for the further component (b) to polyacrylate resins having structural units of the formulae (I) and/or (II) and also active structural radicals of a photoinitiator of the Norrish II type. Through an appropriate selection of the compounds it is possible for solid, soft or liquid polymer formulations to result. Their synthesis is in principle as described for the polyacrylates of component (a), without the introduction of double bonds that is necessary in the case of component (a). If component (b) consists of such polyacrylate resins, it is preferably combined with a component (a) in the form of vinyl ethers. In this context, solid vinyl ethers, such as vinylcarbazole and divinylethyleneurea, are particularly suitable for UV powder coating materials.

Further preferred components (b) are liquid or solid, saturated and/or unsaturated polyesters, which are obtained by conventional polycondensation of saturated and/or unsaturated dicarboxylic acids and/or their anhydrides and polyhydric alcohols. In this context, it may also be advantageous to start from the esters of the carboxylic acids and to generate the polyesters by transesterification at high temperatures, since such transesterifications proceed more readily and more rapidly in certain cases than the direct esterification. In addition, polyesters with amide structures can also be obtained by using, in whole or in part, polyfunctional amines. The additional use of monofunctional compounds is also possible in order, for example, to regulate the molecular weight.

In the case of the binder of the invention, component (a) comprises structural units of the formulae (I) and/or (II) whereas component (b) need not necessarily contain these structural units. However, it has been found advantageous if polyesters likewise containing structural units of the formulae (I) and/or (II) are used as component (b). In that case, the readily available esterlike dicyclopentadiene adducts, of the formulae (III) and (IV), with polycarboxylic acids are preferred. The adducts of maleic anhydride and water with dicyclopentadiene, of the formulae (V) and (VI), are very readily available.

Furthermore, the dihydrodicyclopentadienol of formula (VII) as indicated below is available commercially and can be used when synthesizing the polyesters, in which case preferably the structural units of the formulae (I) and/or (II) are likewise introduced.

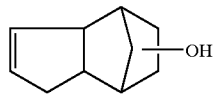

(VII)

Examples of further compounds which can be employed in accordance with the invention are adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid, pyromeilitic acid, ethylene glycol, polyethylene glycols, propylene glycol, polypropylene glycols, butanediol isomers, hexanediol, neopentyl glycol, trimethylolpropane, glycerol, pentaerythritol, bisphenol A, hydrogenated bisphenol A, OH-polyfunctional polymers, such as hydroxyl-modified polybutadienes or hydroxyl-bearing polyurethane prepolymers and epoxy resins, polyfunctional natural substances or their derivatives, such as linseed oil fatty acid, dimeric and polymeric linseed oil fatty acid, castor oil, castor oil fatty acid. Also of importance are alkoxylated OH-functional compounds, such as the ethoxylation and propoxylation products of the abovementioned polyols, for example.

Also suitable for component (b) are polyester resins into which amide or imide structures have been introduced. The introduction of such amide or imide structures into polyester resins is prior art and is disclosed, for example, in DE 15 700273 and DE 17 200323.

Structural units of the formulae (I) and/or (II) can be introduced preferably by way of the acidic esters of the formulae (V) and (VI) in the course of the polycondensation.

Oligodicyclopentadiene mixtures are obtained in a manner known per se by polycycloaddition of cyclopentadiene under superatmospheric pressure at temperatures from 170 to 300° C. These mixtures can be worked up by distillation. Preferably, however, they are reacted directly with, for example, maleic anhydride and water to form compounds of the formulae (V) and (VI) and are incorporated by condensation into the polyesters of component (b).

A further option is to prepare polyesters with an excess of acid and then to react these polyesters with dicyclopentadiene. A high conversion in this case generally necessitates the use of catalysts, such as boron trifluoride etherate. At relatively high temperatures and under superatmospheric pressure, oligodicyclopentadiene structures are also formed in this reaction.

Where the polyesters in this reaction contain double bonds in the polymer chain, in the form of maleic or fumaric esters, for example, then grafting with cyclopentadiene produces endomethylenetetrahydro-phthalic acid structures of formula (VIII)

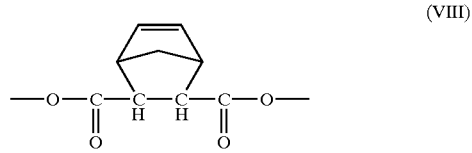

(VIII)

Polyesters of importance for component (b) of the binders of the invention include in particular those obtained by way of hydroxy-functional allyl ethers, these polyesters being described in DE 43 21 533. The photosensitivity of these polyesters is markedly better.

Further polyesters of importance as component (b) are those whose carboxyl groups that have remained free during the polycondensation are reacted with unsaturated epoxy compounds, preferably glycidyl (meth)acrylate. This also increases the photosensitivity.

In addition, other polyesters which are of importance as component (b) are those that contain groups which in the triplet-excited state are capable of abstracting hydrogen atoms and which have structures of a photoinitiator of the Norrish II type. Preference is given here to benzophenone structures. Benzophenone structures can be incorporated, for example, by way of benzophenonecarboxylic acids or hydroxy compounds of benzophenone. In this context, it has proven advantageous first to use an excess of hydroxy compounds to prepare hydroxyl-terminated polyester precursors and then to react these with benzophenonetetracarboxylic dianhydride. In that case the benzophenone structures are incorporated into the chains of the polyesters of component (b) and carboxyl groups are produced. Preferably, these carboxyl groups are then reacted with unsaturated epoxy compounds, preferably glycidyl (meth) acrylate.

In experiments, polyesters which have proven particularly favorable as component (b) are those unsaturated polyesters which contained structural units of the formulae (I) and/or (II) together with residues of maleic or fumaric esters and which were introduced by way of compounds of the formulae (IV) and/or (V), in the course of which further residues of maleic or fumaric esters were incorporated by way of maleic or fumaric anhydride and had the additionally active structural radicals of a photoinitiator of the Norrish II type.

Preferred saturated polyesters of component (b) are in principle those which in addition to structural units of the formulae (I) and/or (II) also have active structural radicals of a photoinitiator of the Norrish II type.

The polyesters of component (b) are in principle synthesized in accordance with the specific requirements with regard, for example, to the hardness, elasticity, viscosity or softening point that are made of the binder in accordance with the desired application, in accordance with rules known to the skilled worker, by selection of the synthesis components and adjustment of the degree of condensation.

The invention will be explained further below with reference to examples.

EXAMPLES

Compound I (Preparation of a Monocarboxylic Acid of the Formula (V))

| | |
|---|---|
| 710.81 g of 93% pure dicyclopentadiene | (5.0 mol) and |
| 490.30 g of maleic anhydride | (5.0 mol) | are weighed into a stirred flask with heater and reflux condenser.

The mixture is heated to 125° C. under a gentle stream of nitrogen. Then 95.00 g of water (5.0 mol+5 g)

are added from a dropping funnel over the course of one hour. The mixture is allowed to react at 125° C. for one hour, during which a monocarboxylic acid of the formula (V) is formed.

Example 1

Preparation of a polyester in accordance with component (b) having structural units of the formulae (I) and/or (V), which additionally comprises active structural radicals of a photoinitiator of the Norrish II type.

240.00 g of dicyclohexanolpropane (1 mol)

236.00 g of 1,6-hexanediol (2 mol)

194.00 g of dimethyl terephthalate (1 mol) and 0.67 g of tin acetate are weighed into a stirred flask with heater and top-mounted distillation attachment.

This initial charge is heated rapidly to 120° C. under a gentle stream of nitrogen and the temperature is then raised gradually to 190° C. over 3 hours, during which the water of condensation produced is removed by distillation.

The contents of the flask are cooled to 90° C. and

| | |
|---|---|
| 516.80 g of compound 1 | (2 mol) |
| 98.60 g of fumaric acid | (0.85 mol) |
| 87.36 g of di(ethylhexyl) benzophenonetetracarboxylate | (0.15 mol) |
| 4.00 g of dibutyltin dilaurate (DBTL) and | |
| 0.50 g of hydroquinone | | are added.

The reaction mixture is heated rapidly to 130° C. under a gentle stream of nitrogen and the temperature is then raised slowly to 190° C. over the course of 6 hours, during which the water of condensation produced is removed by distillation. The resultant resin has an acid number of 11, solidifies on cooling and can be ground to give noncaking powders.

Example 2

Preparation of a polyester in accordance with component (b) having structural units of the formulae (I) and/or (V), which additionally comprises active structural radicals of a photoinitiator of the Norrish II type.

| | |
|---|---|
| 300.00 g of triethylene glycol | (2 mol) |
| 134.00 g of diethylene glycol monoethyl ether | (1 mol) |
| 516.80 g of compound 1 | (2 mol) |
| 156.60 g of fumaric acid | (1.35 mol) |
| 87.36 g of di(ethylhexyl) benzophenonetetracarboxylate | (0.15 mol) |
| 4.00 g of dibutyltin dilaurate (DBTL) and | |
| 0.50 g of hydroquinone | | are weighed into a stirred flask with heater and top-mounted distillation attachment.

The reaction mixture is heated rapidly to 130° C. under a gentle stream of nitrogen and the temperature is then raised slowly to 190° C. over the course of 4.5 hours, during which the water of condensation produced is removed by distillation. The resultant liquid resin has an acid number of 27, and a viscosity of 7800 mPas/25° C.

Example 3

Preparation of a polyester in accordance with component (b) having structural units of the formulae (I) and/or (V)

| | |
|---|---|
| 300.00 g of triethylene glycol | (2 mol) |
| 134.00 g of diethylene glycol monoethyl ether | (1 mol) |
| 516.80 g of compound 1 | (2 mol) |
| 174.00 g of fumaric acid | (1.50 mol) |
| 4.00 g of dibutyltin dilaurate (DBTL) and | |
| 0.50 g of hydroquinone | | are weighed into a stirred flask with heater and top-mounted distillation attachment.

The reaction mixture is heated rapidly to 130° C. under a gentle stream of nitrogen and the temperature is then raised slowly to 190° C. over the course of 4.5 hours, during which the water of condensation produced is removed by distillation. The resultant liquid resin has an acid number of 22, and a viscosity of 2360 mPas/25° C.

Example 4

Preparation of a polyacrylate in accordance with component (b) having structural units of the formula (I) and copolymerically bonded photoinitiator 243 g of isopropanol and 243 g of toluene are weighed into a stirred flask with heater, reflux condenser and nitrogen inlet and are heated to about 85° C. at reflux. Then 300 g of dihydrodicyclopentadienyl acrylate 370 g of methyl methacrylate 120 g of glycidyl methacrylate 219 g of butyl acrylate and 10 g of mercaptoethanol are added from a funnel over the course of two hours and 30 g of Wako V 59 (from Wako, azo initiator) and 180 g of toluene are added from a second funnel over the course of 2.5 hours and post-polymerization is carried out at reflux for 2 hours. The batch is cooled to about 50° C. and then 166 g of 4-hydroxybenzophenone and 1 g of dimethylaminopyridine are added.

The condenser is swapped for a top-mounted distillation attachment and the temperature is raised to about 160° C. over the course of 8 hours, during which the solvent is removed by distillation. Then subatmospheric pressure is applied and the contents of the flask are held at 160° C. for a further 2 hours. The result is a resin melt which when poured out onto an aluminum foil solidifies and, after grinding, gives blocking-resistant powders at 25° C.

The resin shows a glass transition temperature of 52° C. and a melting point of 62° C. as measured by means of DSC (differential scanning calorimetry).

Example 5

Preparation of a polyurethane resin having vinyl ether functions which additionally comprises active structural radicals of a photoinitiator of the Norrish II type.

| | |
|---|---|
| 588.0 g of 1,6-hexamethylene diisocyanate | (4.5 mol) |
| 900.0 g of butyl acetate | |
| 96.7 g of benzophenonetetracarboxylic dianhydride | (0.3 mol) and |
| 0.5 g of dibutyltin dilaurate | | are weighed into a stirred flask with heater, reflux condenser and nitrogen inlet and the mixture is heated under reflux with stirring and under anitrogen atmosphere. In the course of this heating, the evolution of gas begins, and is over after about 1 hour. Then, at approximately 60° C., 118 g of 1,6-hexanediol and 696 g of 1,4-butanediol monovinyl ether (6 mol)

are added over the course of about 1 hour. The reaction solution is then held at 60° C. for a further 4 hours. To consume the residual isocyanate, 50 g of methanol are added, and stirring is continued at 60° C. for 2 hours. The condenser is swapped for a top-mounted distillation attachment, subatmospheric pressure is applied and the temperature is slowly raised to 110° C. in order to remove the solvent by distillation. The result is a liquid viscous resin.

Testing of the Examples

To produce powder coating materials, resin mixtures are prepared by kneading in a heatable laboratory compounder under nitrogen at 100° C., and these mixtures are discharged onto aluminum foil and allowed to cool. The resins are then ground in a laboratory hammer mill and are sieved to a particle size of <30 μm. The resultant powder coating materials are scattered using a sieve onto cleaned steel panels. The steel panels are then placed on a temperature-controlled hotplate at a temperature of 130° C. and are conditioned at this temperature for 5 minutes. During this time, the powder covering melts and forms a layer which flows and which is then irradiated with a UV quartz lamp having an emission maximum at about 365 nm and an energy output (measured in the plane of the coating films) of 17 mW/cm² for about 2 minutes. Thereafter, the samples are removed from the hotplate and, about one hour after cooling, are rubbed 30 times with a cotton pad wetted with acetone. Liquid coating materials are homogenized in a stirred flask at 50° C., knife-coated onto degreased steel panels (about 40 μm dry) and then likewise irradiated with a UV quartz lamp at 17 mW/cm² for about 2 minutes.

The results are depicted in Table 1.

TABLE 1

| Coating material No. | Substance A | Substance B | Auxiliaries | Acetone resistance |
|---|---|---|---|---|
| 1 (powder) | DVEDH 80 g | B1 100 g | — | 0–1 |
| 2 (powder) | DVEDH 80 g | B1 100 g | 5 g BDMK | 0 |
| 3 (liquid) | TEGDVE 100 g | B2 100 g | — | 0–1 |
| 4 (liquid) | TEGDVE 100 g | B2 100 g | 5 g BDMK | 0 |
| 5 (liquid) | TEGDVE 100 g | B3 100 g | — | 3–4 (comparative) |
| 6 (liquid) | TEGDVE 100 g | B3 100 g | 5 g BDMK | 1 |
| 7 (liquid) | B5 120 g | B2 90 g | — | 1 |
| 8 (liquid) | B5 120 g | B2 90 g | 3 g BDMK | 0 |
| 9 (liquid) | B5 120 g TEGDVE 50 g | B2 90 g | — | 0 |
| 10 (liquid) | B5 120 g | B3 90 g | — | 1 |
| 11 (liquid) | B5 120 g | B3 90 g | 3 g BDMK | 0 |
| 12 (liquid) | B5 120 g TEGDVE 50 g | B2 90 g | 3 g BDMK | 2–3 |

Because of the binders of the invention, the solid and liquid coating materials of the examples described here possess good photocrosslinkability.

Coating material No. 5 evidences a poorer UV sensitivity, which is a result of the fact that component (b) of the binder of the invention, although it contains structural units of the formula (I) and/or (II) and residues of maleic/fumaric esters, contains no active structural radicals of a photoinitiator of the Norrish H type.

We claim:

1. A binder which is curable thermally and/or by high-energy radiation and comprises a mixture of substances comprising (a) as one component, polyurethanes comprising structural units of the formulae (I) and/or (II) which have at least one vinyl ether, vinyl ester, (meth)acrylic and/or allyl group,

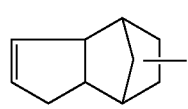

(I)

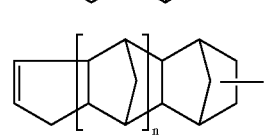

(II)

n = 1–10 which have been introduced by using compounds of the formulae (V) and/or (VI),

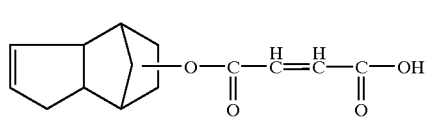

(V)

-continued

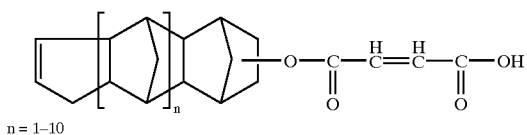

n = 1–10

(b) as a further component, saturated polymers and/or unsaturated polymers different from component (a), with the proviso that the further component (b) has structural units of the formulae (I) and/or (II) at least when it contains saturated polymers.

2. A binder as claimed in claim 1 being for coating materials.

3. A binder as claimed in claim 1, wherein components (a) or (b) or (a) and (b) possess copolymerically bonded groups which in the triplet-excited state are capable of abstracting hydrogen.

4. A binder as claimed in claim 1, wherein components (a) and (b) are present in a ratio by weight of from 99.5:0.5 to 0.5:99.5.

5. A binder as claimed in claim 1, wherein, in components (a) and, if desired, (b), the structural units of the formulae (I) and (II) are introduced with the use of compounds of the formulae (V)

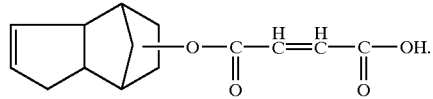

6. A formulation comprising a binder as claimed in claim 5.

7. A formulation as claimed in claim 6 in the form of a pigmented or unpigmented coating material.

8. A formulation as claimed in claim 7 which comprises the binder in liquid or solvent-free form or in the form of solutions or dispersions with appropriate solvents.

9. A formulation as claimed in claim 8 in the form of a powder coating material.

10. A formulation as claimed in claim 7 which comprises at least one customary coatings auxiliary or additive as further constituents.

11. A formulation as claimed in claim 18 in the form of a powder coating material.

12. A formulation as claimed in claim 7 in the form of a powder coating material.

13. A process for producing coatings, which comprises applying a formulation as claimed in claim 6 to the surface that is to be coated and curing the applied coating thermally and/or by irradiation with UV light or electron beams.

14. A binder as claimed in claim 1, wherein, in components (a) and, if desired, (b), the structural units of the formulae (I) and (II) are introduced with the use of compounds of the formulae (VI)

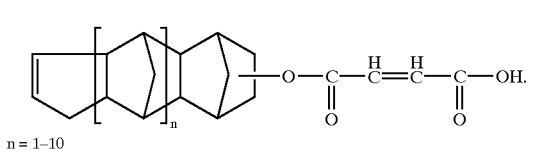

n = 1–10

15. A formulation comprising a binder as claimed in claim 14.

16. A formulation as claimed in claim 15 in the form of a pigmented or unpigmented coating material.

17. A formulation as claimed in claim 16 which comprises the binder in liquid or solvent-free form or in the form of solutions or dispersions with appropriate solvents.

18. A formulation as claimed in claim 17 in the form of a powder coating material.

19. A formulation as claimed in claim 16 which comprises at least one customary coatings auxiliary or additive as further constituents.

20. A formulation as claimed in claim 19 in the form of a powder coating material.

21. A formulation as claimed in claim 16 in the form of a powder coating material.

22. A process for producing coatings, which comprises applying a formulation as claimed in claim 15 to the surface that is to be coated and curing the applied coating thermally and/or by irradiation with UV light or electron beams.

23. A formulation comprising a binder as claimed in claim 1.

24. A formulation as claimed in claim 23, wherein the binder is obtained by a process which comprises, in components (a) and if desired (b), the structural units of the formulae (I) and (II) are introduced by the use of compounds of the formulae (V) and (VI).

25. A formulation as claimed in claim 24 in the form of a pigmented or unpigmented coating material.

26. A formulation as claimed in claim 25 which comprises the binder in liquid or solvent-free form or in the form of solutions or dispersions with appropriate solvents.

27. A formulation as claimed in claim 26 in the form of a powder coating material.

28. A formulation as claimed in claim 25 comprises at least one customary coatings auxiliary or additive as further constituents.

29. A formulation as claimed in claim 28 in the form of a powder coating material.

30. A formulation as claimed in claim 25 in the form of a powder coating material.

31. A process for producing coatings, which comprises applying a formulation as claimed in claim 29 to the surface that is to be coated and curing the applied coating thermally and/or by irradiation with UV light or electron beams.

32. A formulation as claimed in claim 23 in the form of a pigmented or unpigmented coating material.

33. A formulation as claimed in claim 32 which comprises the binder in liquid or solvent-free form or in the form of solutions or dispersions with appropriate solvents.

34. A formulation as claimed in claim 33 in the form of a powder coating material.

35. A formulation as claimed in claim 32 which comprises at least one customary coatings auxiliary or additive as further constituents.

36. A formulation as claimed in claim 35 in the form of a powder coating material.

37. A formulation as claimed in claim 32 in the form of a powder coating material.

38. A process for producing coatings, which comprises applying a formulation as claimed in claim 23 to the surface that is to be coated and curing the applied coating thermally and/or by irradiation with UV light or electron beams.

39. A binder as claimed in claim 1, wherein component (a) includes structural residues of a photoinitiator of the Norrish II type.

40. A binder as claimed in claim 1, wherein component (b) is a polyacrylate.

41. A binder as claimed in claim 40, wherein component (b) contains structural units of the formulae (I) and/or (II) and also structural residues of a photoinitiator of the Norrish II type.

42. A binder as claimed in claim 1, wherein component (b) is a polyester.

43. A binder as claimed in claim 42, wherein component (b) contains structural units of the formulae (I) and/or (II).

44. A binder as claimed in claim 43, wherein the structural units of the formulae (I) and/or (II) have been introduced into component (b) by using compounds of the formulae (V) and/or (VI).

45. A powder coating material, comprising a binder as claimed in claim 1.

* * * * *

UNITED STATES PATENT AND TRADEMARK OFFICE
CERTIFICATE OF CORRECTION

PATENT NO.     : 6,632,481 B1
DATED          : October 14, 2003
INVENTOR(S)    : Blum et al.

It is certified that error appears in the above-identified patent and that said Letters Patent is hereby corrected as shown below:

Column 15,
Line 47, "claim 18" should be -- claim 10 --.

Column 16,
Line 34, after "claim 25" insert -- which --.
Line 42, "claim 29" should be -- claim 24 --.

Signed and Sealed this

Twenty-seventh Day of January, 2004

JON W. DUDAS
*Acting Director of the United States Patent and Trademark Office*